Sept. 12, 1967 E. V. OMAN 3,340,755
TURNING MACHINE
Filed April 12, 1965 5 Sheets-Sheet 1
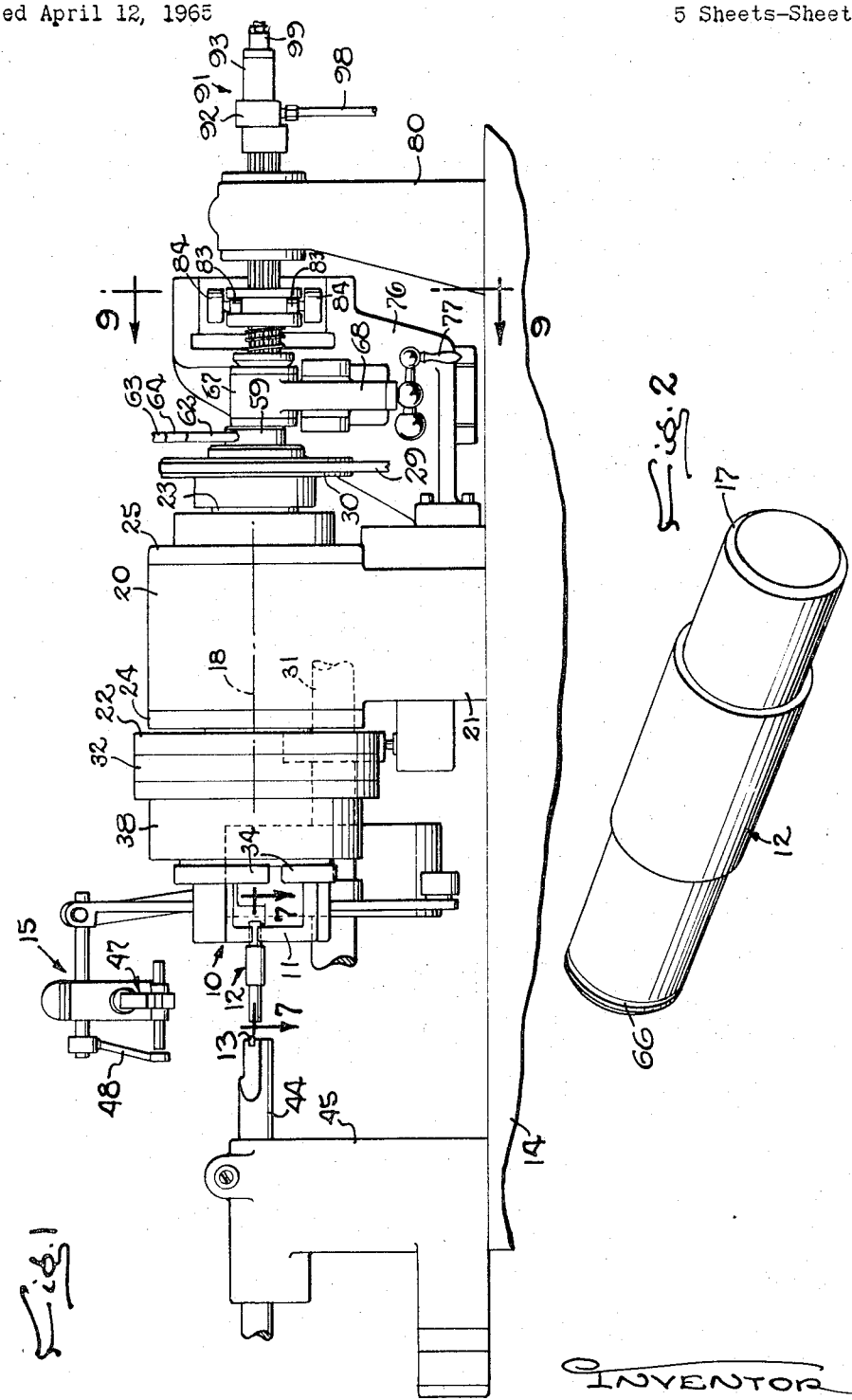
INVENTOR.
Edwin V. Oman
by Wolfe, Hubbard, Voit & Osann
ATTORNEY

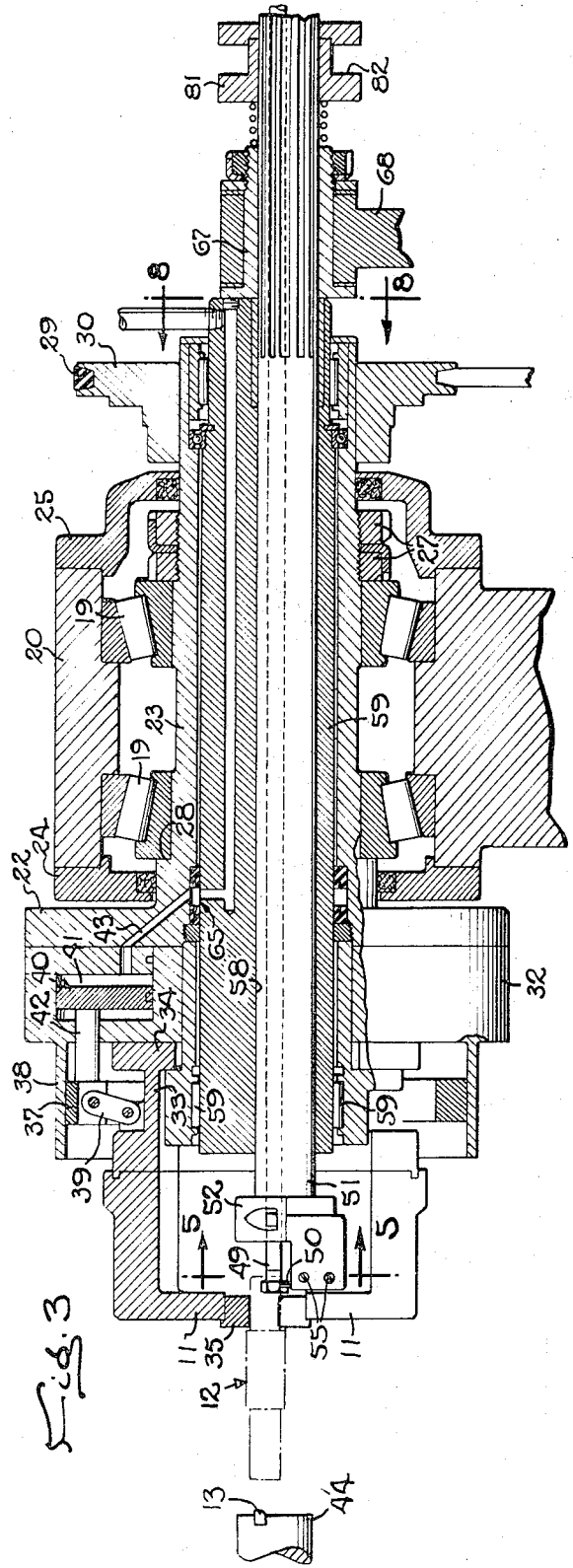
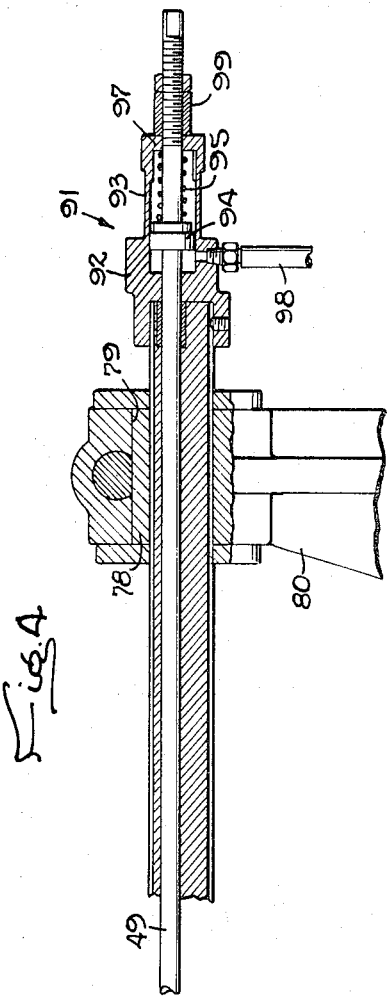

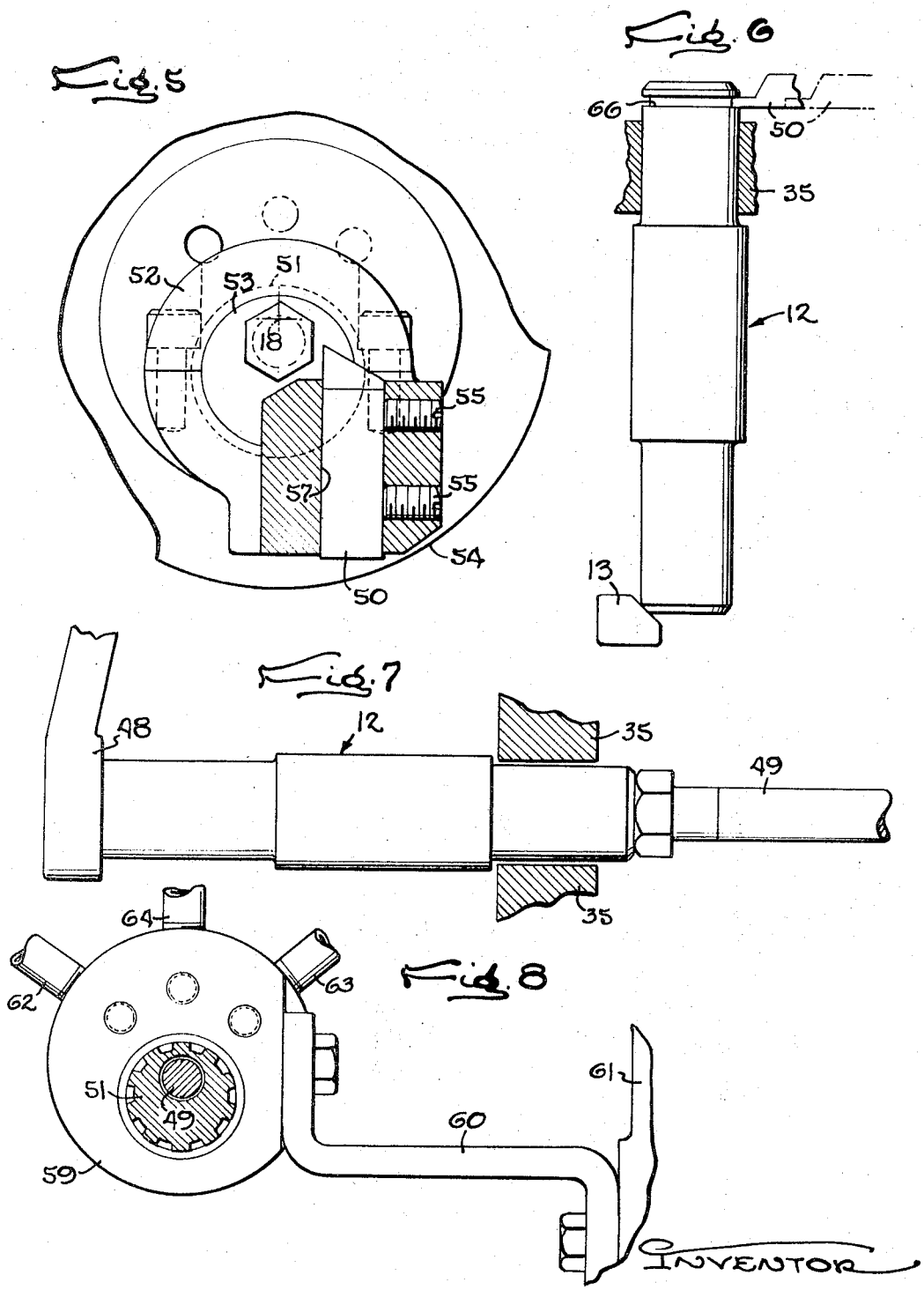

Sept. 12, 1967    E. V. OMAN    3,340,755
TURNING MACHINE
Filed April 12, 1965    5 Sheets-Sheet 4

INVENTOR
Edwin V. Oman
by Wolfe, Hubbard, Voit & Osann
ATTORNEYS

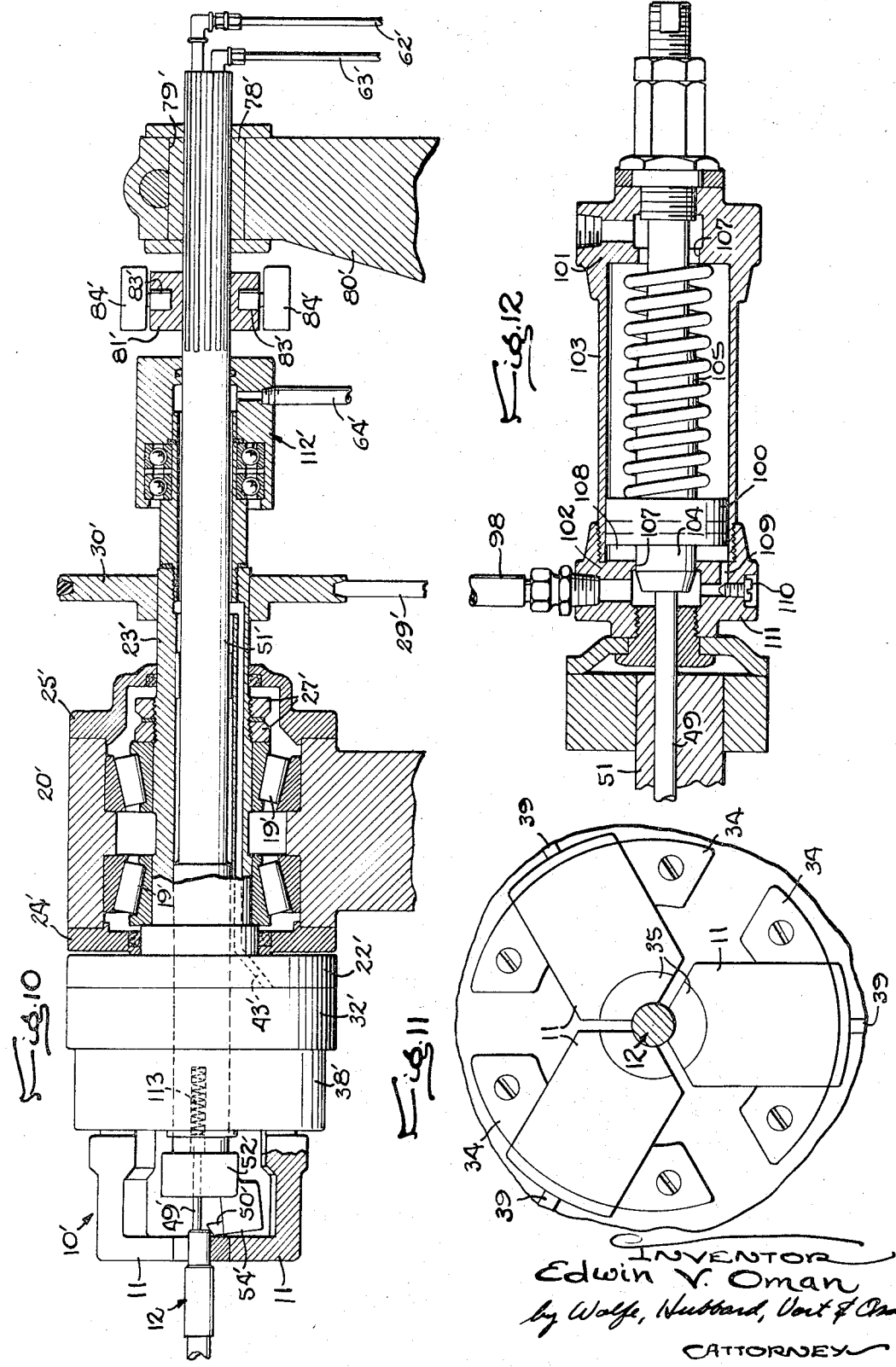

United States Patent Office 3,340,755
Patented Sept. 12, 1967

3,340,755
TURNING MACHINE
Edwin V. Oman, Rockford, Ill., assignor to Rockford Screw Products Co., Rockford, Ill., a corporation of Illinois
Filed Apr. 12, 1965, Ser. No. 447,310
3 Claims. (Cl. 82—2.5)

ABSTRACT OF THE DISCLOSURE

A turning machine having a hollow rotary chuck with angularly spaced jaws for gripping a workpiece intermediate its ends and rotating the workpiece about its longitudinal axis. The chuck is mounted on a hollow spindle journaled on the machine base with a tool bar extending through the spindle and supporting a cutting tool inside the chuck, the tool bar being movable longitudinally within the spindle and also rotatable within the spindle for both longitudinal and radial motion of the tool inside the chuck. On the end of the tool bar adjacent the chuck is a spring-loaded knock-out pin for ejecting parts from the chuck, and a reciprocating actuator in the form of a pneumatic cylinder for retracting the pin prior to a machining operation, the cylinder being formed to trap air and prevent slapping of its piston when the knock-out pin is released to the action of the loading spring.

Background of the invention

This invention relates to a turning machine including a rotary chuck with jaws for gripping a workpiece and rotating the latter as a machining operation is performed on the portion of the workpiece projecting out of the chuck.

The general object of the present invention is to provide a novel machine of the foregoing character in which both the inner and outer ends of a workpiece may be machined simultaneously in a single operation for greater accuracy in the relative positioning of the machined surfaces and accompanying savings in production cost.

A more specific object is to grip a workpiece in a hollow chuck with both the inner and outer ends of the workpiece projecting beyond the chuck jaws, and mount a second tool inside the chuck for cutting engagement with the inner end portion while the workpiece is gripped for a machining operation on the outer end portion.

Another object is to mount such a tool for selective feeding either longitudinally or radially of the workpiece.

A further object is to provide a knock-out pin inside the chuck capable of being retracted into an out-of-the-way position during the machining operation on the inner end of the workpiece.

Still another object is to cushion the back and forth motion of the knock-out pin and prevent jolting of the tool bar at the end of each stroke.

Other objects and advantages of the invention will become apparent from the following detailed description taken in connection with the accompanying drawings, in which FIGURE 1 is a fragmentary side elevational view of a turning machine embodying the novel features of the present invention.

FIG. 2 is an enlarged perspective view of a representative workpiece.

FIG. 3 is an enlarged fragmentary cross-sectional view taken in a longitudinal vertical plane through the machine in FIG. 1.

FIG. 4 is a view similar to FIG. 3 showing the right-hand portion of the machine.

FIG. 5 is an enlarged cross-sectional view taken substantially along the line 5—5 of FIG. 3.

FIG. 6 is an enlarged plan view of the workpiece showing the operating position of the inner tool.

FIG. 7 is an enlarged view of a portion of FIG. 3 with the parts in moved positions.

FIG. 8 is an enlarged fragmentary cross-sectional view taken substantially along the line 8—8 of FIG. 3.

FIG. 10 is a view similar to FIG. 3 showing a modified form of the invention.

FIG. 11 is an enlarged view of the outer end of the chuck.

FIG. 12 is an enlarged fragmentary cross-sectional view similar to part of FIG. 4 and showing another modification.

Figure 9:
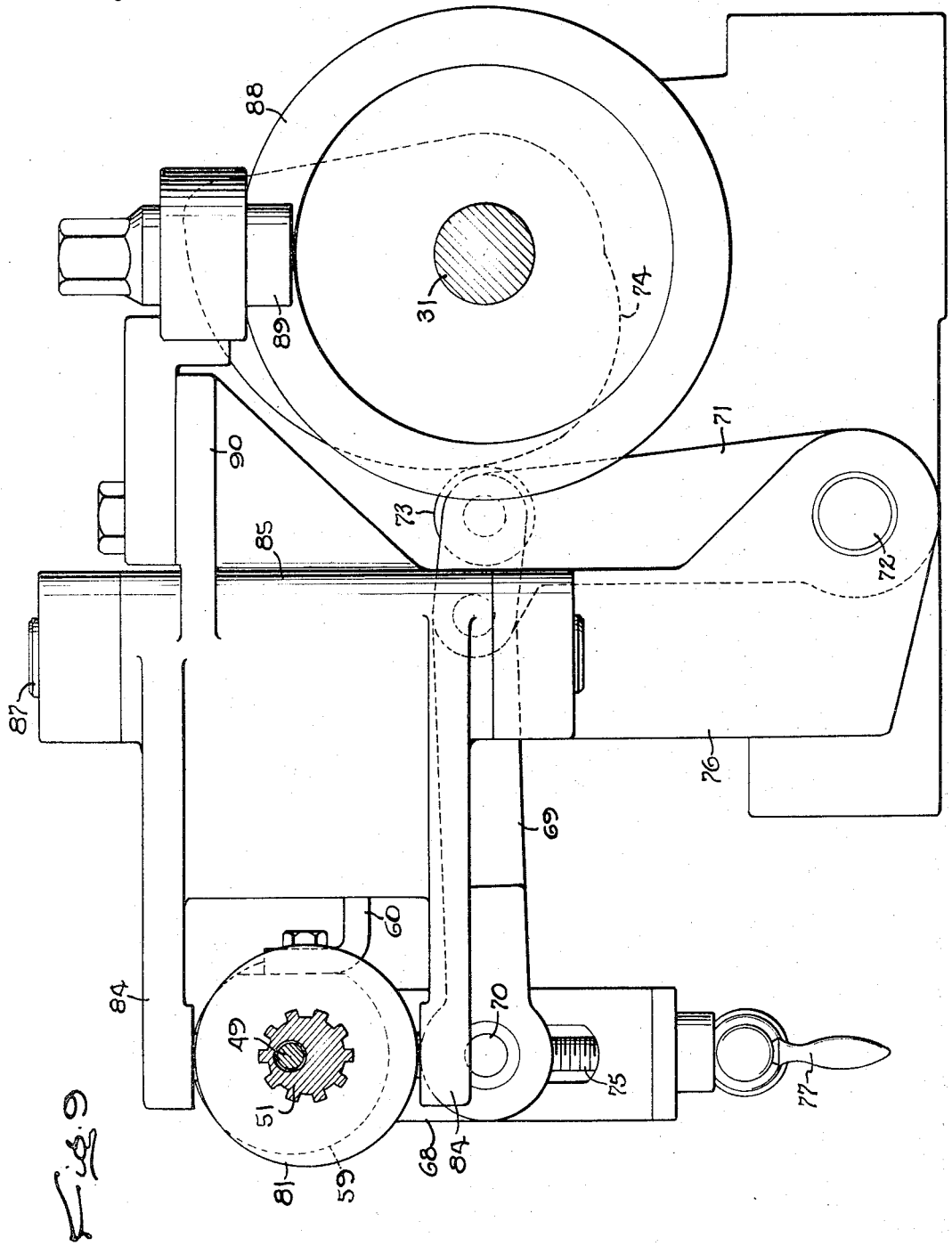
FIG. 9 is an enlarged cross-sectional view taken along the line 9—9 of FIG. 1.

As shown in the drawings for purposes of illustration, the invention is embodied in a turning machine having a rotary chuck 10 with angularly spaced jaws 11 for gripping a workpiece 12 and rotating the latter as its outer end is machined by a tool 13 supported on the machine base 14 for movement into engagement with the workpiece. In such machines, successive workpieces such as castor pins or double-ended stud blanks are inserted in the chuck by a transfer device 15 of well-known construction and operation which picks up the parts from a feeder (not shown), alines each part with the chuck opening, and then moves the part endwise into the chuck. After the chuck jaws have been clamped around the part, the transfer device releases the part and is retracted to an out-of-the-way position to permit the tool to move into engagement with the outer end of the work and perform the machining operation, herein the cutting of a bevel 17 (FIG. 2) on the outer end. Then the tool is retracted and the part is released and ejected preparatory to the insertion of the next part to be machined.

In this instance, the chuck 10 is supported on the machine base 14 for rotation about a horizontal axis 18 defined by anti-friction bearings 19 (FIG. 3) fitted in a sleeve 20 integral with the upper end of a post 21 upstanding from the base, the chuck being carried on a radial flange 22 encircling the left or outer end of a spindle 23 projecting through and journaled in the bearings. Apertured covers 24 and 25 telescoped over the spindle on opposite sides of the supporting sleeve are bolted to the latter to enclose the bearings, and the spindle is located axially of the sleeve by lock nuts 27 threaded onto the inner end portion of the spindle and an annular shoulder 28 on the spindle abutting against one of the bearing race rings. A motor (not shown) drives a V-belt 29 trained around a pulley 30 on the inner end portion of the spindle and thus rotates the spindle and the chuck about an axis coinciding with the longitudinal axis of the part gripped in the chuck. Through a suitable drive connection, the motor also rotates an elongated camshaft 31 (FIG. 9) paralleling the spindle on one side of the latter and carrying a series of cams for operating the various mechanisms of the machine.

As shown most clearly in FIGS. 1, 3 and 11, the chuck 10 is supported on the outer end of a disk 32 coaxial with the spindle 23 and bolted to the spindle flange 22. The chuck is of well-known construction and comprises a plurality of angularly spaced resiliently flexible spring arms 33 each having an arcuate base 34 on its inner end bolted to the disk with the arm generally parallel to the spindle axis and projecting outwardly from the disk. The jaws 11 are carried on the outer ends of these arms and are formed by sections of L-shaped pieces extending beyond the arms and then radially inwardly toward each other in a common plane at the outer end of the chuck. The free ends of the jaws are formed by inserts 35 which define the chuck opening and engage the workpiece 12 when the chuck is closed.

To open and close the chuck 10, an actuating ring 37 (FIG. 3) is slidably guided along the inner side of a cylindrical flange 38 projecting outwardly from the disk 32 outside the spring arms 33 and is connected to the latter by toggle links 39 pivoted on the arms and on the actuating ring so that outward sliding of the actuating ring rocks the toggle links counterclockwise as viewed in FIG. 3 thereby to urge the outer end portions of the spring arms toward each other to clamp the jaws against a workpiece in the chuck. As the actuating ring moves back toward the mounting disk 32, the links rock clockwise to release the arms and permit the latter to flex away from each other.

Such back and forth motion of the actuating ring 37 is produced by a pneumatic actuator comprising a ring-shaped piston 40 (FIG. 3) slidably guided in an annular pressure chamber 41 in the disk 32, the piston being connected to the actuating ring by pins 42 projecting through the outer end of the mounting disk. When pressure fluid is admitted to the chamber through a conduit 43 through the flange 22 and the inner portion of the disk 32, the piston moves outwardly to close the chuck. When the closing pressure is released, the spring arms open the chuck.

Herein, the tool 13 for machining the outer end portion of the workpiece is an end-working cutter mounted on a tool bar 44 guided for horizontal reciprocation toward and away frm the chuck 10 on a pedestal 45 upstanding from the outer end of the machine base 14, the left end in FIG. 1. The tool is supported on the end of the tool bar adjacent the chuck and is formed with a cutting edge positioned for engagement with the outer peripheral edge of the workpiece to form the bevel 17 as the tool is fed toward and into the workpiece. It should be understood, however, that this tool may be mounted in different ways dependent upon the type of machining operation to be performed.

In operation, successive workpieces 12 are picked up by the transfer device 15 which includes a gripper 47 for holding the workpiece intermediate its ends as shown in FIG. 1 with the longitudinal axis of the part parallel to the axis of rotation of the chuck 10. Then the gripper swings the part forwardly into alinement with the chuck and moves the part endwise into the chuck. This transfer device is well known in the art and thus is shown only generally herein, the motion of the device being produced and controlled in a well known manner by cams on the camshaft 31. The transfer device also includes a positioning finger 48 engageable with the outer end of the workpiece to press the inner end firmly against a spring-loaded knock out pin 49 within the chuck and thus position the part accurately within the chuck before the jaws 11 are closed on the part.

In accordance with the primary aspect of the present invention, the workpiece 12 in the chuck 10 is gripped between its ends with the inner end portion projecting inwardly beyond the chuck jaws 11 into the hollow interior of the chuck, and a second tool 50 is supported inside the chuck in position to perform a second machining operation on the inner end portion while the part is gripped for the machining of the outer end. Accordingly, the two operations may be performed simultaneously for greater accuracy in the relative positioning of the machined surfaces, and the need for transferring the workpiece and performing separate operations is eliminated with resulting savings in time and production costs.

As shown in FIGS. 3 and 5, the second tool 50 is mounted in a tool holder on a tool bar 51 extending through the spindle 23 parallel to the axis of rotation of the latter and projecting through the mounting disk 32 into the interior of the chuck 10, the tool holder being disposed on one side of the inner end portion of the workpiece. In this instance, the tool holder is carried on a split ring 52 clamped around the necked-down end 53 (FIG. 5) of the tool bar and comprises a slotted block 54 with set screws 55 threaded through the block to clamp the tool in the slot 57. The cutting end of the tool is disposed above the block in position to be tilted or rotated into the workpiece, and the tool bar is supported for rotation about its longitudinal axis to feed the tool into the work.

Herein, the tool bar 51 is supported in a horizontal bore 58 through an elongated cylindrical bar 59 disposed within the spindle 23 which is in the form of a flanged sleeve. Roller bearings 59 adjacent the ends of the spindle support the bar within the spindle and a bracket 60 (see FIGS. 8 and 9) anchors the support bar to a part 61 of the machine base 14 to prevent rotation of the bar with the spindle. With this arrangement, lubricant, coolant and pressurized air for operating the chuck may be brought into the machine through lines 62, 63 and 64 (FIGS. 1 and 8) connected to the exposed end of the support bar, and carried through conduits in the bar. Air is transmitted through a transfer ring at 65 (FIG. 3) to the chuck pressure chamber 41.

To produce the desired tool motion within the chuck 10, herein to cut a groove 66 in the inner end portion as shown in FIGS. 2 and 6, the tool bar 51 is spline-coupled to a sleeve 67 (FIGS. 1, 3 and 9) integral with the upper end of an upright crank arm 68 disposed beneath the tool bar beyond the right end of the support bar 59, and the crank arm is adapted to be rocked back and forth about the axis of the tool bar by a generally horizontal connecting link 69 (see FIG. 9) pivotally connected at one end at 70 to the crank arm and pivoted adjacent its other end on a generally vertical arm 71 which is supported for rocking in a vertical plane about a pivot pin 72 at its lower end supported on an upright bracket 76. The horizontal link 69 projects beyond the upper end of the arm 71 and carries a follower roller 73 which rides on a cam 74 on the camshaft 31, the cam being shaped to rock the arm 71 back and forth about the pin 72 and thus shift the link 69 endwise back and forth to rotate the sleeve 67 and the tool bar through an arc determined by the shape of the cam, swinging the tool from the brooken line position in FIG. 6 to the full line position. To permit adjustment of depth of cutting by the tool 50, the pivot 70 is formed on a nut adjustable longitudinally of the crank 68 along a screw 75 turned by a crank 77 on the lower end of the screw. The right end portion of the tool bar, beyond the tool actuating mechanism, is slidably and rotatably supported in a bushing 78 (FIG. 4) in a bore 79 through the upper end of a pedestal 80 upstanding from the base 14.

In addition to the rotary motion imparted to the tool bar 51 in the foregoing manner, the bar also may be moved longitudinally within the bore 58 to feed the tool 50 longitudinally of the workpiece 12. For this purpose, a collar 81 is fastened to the tool bar beyond the sleeve 67 and is formed with a peripheral groove 82 receiving two rollers 83 projecting inwardly toward each other from the parallel legs 84 of a yoke straddling the collar. The yoke legs are fast on a sleeve 85 (FIG. 9) rotatably supported on a vertical shaft 87 on the bracket 76 for rocking back and forth in horizontal planes to slide the collar and the tool bar endwise relative to the support bar. The spline coupling between the tool bar and the sleeve 67 permit the bar to slide relative to the sleeve.

The endwise motion of the yoke is produced by another cam 88 (FIG. 9) on the camshaft that acts on a follower roller 89 to rock an arm 90 fastened to the yoke sleeve 85 about the axis of the shaft 87 thereby rocking the yoke legs back and forth. It should be understood that this mechanism is used only when longitudinal tool feed is required, and that the radial feed mechanism may be used alone.

On the end of the tool bar 51 remote from the tool 50 is a pneumatic actuator 91 (see FIG. 4) connected to the knock-out pin 49 and operable to retract the pin to an out-of-the-way position after a part 12 has been gripped by the chuck jaws 11. In FIGS. 3 and 4, it will be seen that the knock-out pin extends all the way through the tool bar and projects through a fitting 92 (FIGS. 1 and 4) on the right end of the bar and on through a cylinder 93 carried by the fitting. Fast on the pin within the cylinder is a piston 94 which is urged to the left by a coiled spring 95 compressed between the piston and the right end wall 97 of the cylinder thereby to urge the knock-out pin to the left and hold the outer end of the pin adjacent the chuck for engagement with the inner ends of workpieces as the latter are inserted in the chuck.

The positioning finger 48 presses the workpieces 12 into the chuck and shifts the pin 49 to the right against the action of the spring 95 until the part is properly positioned and the chuck is closed. Then, air under pressure is admitted to the left end of the cylinder through a line 98 to force the piston onto the right and retract the knock-out pin away from the workpiece. As the chuck is opened, the air pressure on the piston is released and the return spring snaps the pin to the left to eject the completed workpiece from the chuck. A nut 99 threaded onto the end of the pin beyond the cylinder wall 97 forms a stop determining the extended position of the pin.

An alternate form of the actuating mechanism for the knock-out pin 49 is shown in FIG. 12. In this case, the back and forth motion of the piston 100 is cushioned by trapped air at each end of its stroke to eliminate the tool bar jolts that can result from slapping of the piston against the opposite end walls 101 and 102 of the cylinder 103. For this purpose, enlargements 104 and 105 are formed on the pin 49 on opposite sides of the piston to fit into and close openings 107 in the end walls as the piston approaches the latter to trap air between the piston and the wall in the manner shown at 108 at the left end of the cylinder in FIG. 12. Accordingly, the piston cannot slap against the end walls and jolt the tool bar. A by-pass 109 may be provided at one or both ends of the cylinder to leak the trapped air around the cylinder end wall and permit full but slow extension or retraction of the knock-out pin. The rate of such leakage is controlled by an adjustable restrictor in the form of a screw 110 threaded into the fitting 111 at the left end of the cylinder and partially blocking the by-pass.

An alternate form is shown in FIG. 10 wherein corresponding parts are indicated with corresponding primed reference numbers. In this instance, the tool bar 51' is coaxial with the chuck 10' and the spindle 23' with the latter rotating about the tool bar instead of a stationary support bar as in the preferred form. A tool holder 54' is mounted on the tool bar within the chuck and carries a tool 50' positioned for engagement with the inner end of the workpiece to machine a bevel on the inner end. In this form, therefore, only longitudinal tool feeding motion is required, and this is produced by a yoke with spaced legs 84' carrying rollers 83' fitted in a groove in a collar 81' fast on the tool bar and moved longitudinally of the tool bar by a cam-actuated mechanism similar to that shown in FIG. 9.

Coolant and lubricant for the machine are carried through conduits in the tool bar communicating with lines 63' and 62' at the right end of the bar 51', and pressure fluid for operating the chuck 10' is introduced through a line 64' and a stationary transfer ring 112 encircling the tool bar. The knock-out pin 49' of this form is simply a spring-loaded pin coaxial with the chuck and slidably guided in a blind bore 113 in the end of the tool bar, the outer end of the pin being small enough to engage the work without interfering with the cutting tool. In all other significant respects, the alternate form may be similar to the preferred form.

I claim as my invention:

1. In a turning machine, the combination of, a base, a hollow chuck having jaws at its outer end for gripping a workpiece between the ends of the latter with the opposite end portions of the workpiece projecting both inwardly and outwardly beyond said jaws, a hollow spindle connected to the inner end of said chuck and coaxial therewith, means journaling said spindle on said base for rotation about an axis coinciding with the axis of the chuck, an elongated tool bar disposed within said spindle with one end of the bar projecting through the inner end of the chuck into the interior of the latter, means on said tool bar for supporting a cutting tool adjacent said inner end portion, and mechanism for moving said tool bar to feed the tool thereon both longitudinally and radially of the workpiece in said chuck thereby to machine said inner end portion while the workpiece is gripped for a machining operation on said outer end portion.

2. In a turning machine, the combination of, a base, a hollow chuck having jaws at its outer end for gripping a workpiece between the ends of the latter with the opposite end portions of the workpiece projecting both inwardly and outwardly beyond said jaws, a spindle connected to the inner end of said chuck and coaxial therewith, means journaling said spindle on said base for rotation about an axis coinciding with the axis of the chuck, an elongated tool bar supported on said base and projecting through the inner end of said chuck into the interior thereof, means on said tool bar for supporting a cutting tool adjacent said inner end portion, a knock-out pin projecting outwardly from said tool bar along the axis of said chuck for engagement with the workpiece as the latter is inserted in the chuck, said pin being movable inwardly relative to said tool bar and projecting through the latter and beyond the end thereof remote from said chuck, mechanism for moving said tool bar to feed a tool thereon into said inner end portion, a reciprocating actuator on said remote end of said tool bar connected to said pin to retract the pin away from said inner end portion prior to machining of the latter, means for urging said pin outwardly to eject the workpiece from the chuck when the latter is opened to release the workpiece, said actuator including a cylinder into which said knock-out pin extends, and a piston mounted on said pin within said cylinder whereby back and forth movement of said piston moves said pin relative to said tool bar.

3. The combination defined in claim 2 further including means for trapping air between said piston and one end of said cylinder as said piston moves toward said one end thereby to prevent slapping of said piston against said cylinder end and jolting of said tool bar.

References Cited

UNITED STATES PATENTS 323,180  7/1885  Mason _____ 82—2.7 X
500,753  7/1893  Coldwell _____ 77—3

WILLIAM W. DYER, Jr., *Primary Examiner.*

LEONIDAS VLACHOS, *Examiner.*